(12) United States Patent
Homann et al.

(10) Patent No.: US 12,237,478 B2
(45) Date of Patent: Feb. 25, 2025

(54) ELECTRICAL MEASURING ASSEMBLY FOR SECONDARY ALKALI SOLID-ELECTROLYTE BATTERIES

(71) Applicant: FORSCHUNGSZENTRUM JÜLICH GMBH, Jülich (DE)

(72) Inventors: Gerrit Homann, Münster (DE); Johannes Kasnatscheew, Dülmen (DE); Jijeesh Ravi Nair, Münster (DE); Mariano Grünebaum, Nordkirchen (DE); Martin Winter, Münster (DE)

(73) Assignee: FORSCHUNGSZENTRUM JÜLICH GMBH, Jülich (DE)

( * ) Notice: Subject to any disclaimer, the term of this patent is extended or adjusted under 35 U.S.C. 154(b) by 415 days.

(21) Appl. No.: 17/776,444

(22) PCT Filed: Nov. 4, 2020

(86) PCT No.: PCT/EP2020/080977
§ 371 (c)(1),
(2) Date: May 12, 2022

(87) PCT Pub. No.: WO2021/094167
PCT Pub. Date: May 20, 2021

(65) Prior Publication Data
US 2022/0407125 A1  Dec. 22, 2022

(30) Foreign Application Priority Data
Nov. 12, 2019 (DE) .................. 10 2019 130 507.1

(51) Int. Cl.
*H01M 10/42* (2006.01)
*G01N 27/30* (2006.01)

(52) U.S. Cl.
CPC ...... *H01M 10/4285* (2013.01); *G01N 27/301* (2013.01)

(58) Field of Classification Search
CPC .................. H01M 10/4285; G01N 27/301
See application file for complete search history.

(56) References Cited

U.S. PATENT DOCUMENTS 6,072,299 A * 6/2000 Kurle ............... H01M 10/4257
320/132
6,137,261 A * 10/2000 Kurle ................... H02J 7/0045
320/132

(Continued)

FOREIGN PATENT DOCUMENTS

| CN | 110320476 A | 10/2019 |
|---|---|---|
| DE | 102019101772 A1 | 8/2019 |

(Continued)

OTHER PUBLICATIONS

International Search Report for International Application No. PCT/EP2020/080977 dated Jan. 27, 2021 (3 pages).

(Continued)

*Primary Examiner* — Walter L Lindsay, Jr.
*Assistant Examiner* — Milton Gonzalez
(74) *Attorney, Agent, or Firm* — REISING ETHINGTON, P.C.

(57) ABSTRACT

A measuring arrangement for secondary alkaline solid electrolyte batteries comprising—two electrically non-conductive cell body halves, both cell body halves comprising at least one and one cell body half comprising at least three feedthroughs, both cell body halves forming a receiving space for receiving a solid electrolyte battery cell comprising at least an anode, a cathode and a solid electrolyte. An electrically conductive holding element for each feedthrough; an electrical contact element for each support element, the electrical contact element being adapted to (Continued)

change its length in response to the force applied to the element; and two planar current conductors comprising electrically conductive and electrically non-conductive regions, at least one of the current conductors being adapted to form at least three separate electrically conductive connections between the contact elements and an electrode of the solid electrolyte battery cell.

11 Claims, 9 Drawing Sheets

(56) References Cited

U.S. PATENT DOCUMENTS

| | | |
|---|---|---|
| 10,408,781 B2 | 9/2019 | Hahn et al. |
| 10,673,102 B2 | 6/2020 | Rober et al. |
| 10,950,900 B2 | 3/2021 | Hahn et al. |

FOREIGN PATENT DOCUMENTS

| | | |
|---|---|---|
| EP | 3108224 B1 | 3/2018 |
| EP | 1924849 B1 | 7/2018 |
| JP | 2000030762 A * | 1/2000 |
| JP | 2015153731 A | 8/2015 |
| JP | 2016225115 A | 12/2016 |
| WO | WO2012093652 A1 | 7/2012 |
| WO | WO2017211379 A1 | 12/2017 |

OTHER PUBLICATIONS

English Translation of International Search Report for International Application No. PCT/EP2020/080977 dated Jan. 27, 2021 (2 pages).
International Preliminary Report on Patentability for International No. PCT/EP2020/080977 dated May 17, 2022 (6 pages).
English Translation of International Preliminary Report on Patentability for International No. PCT/EP2020/080977 dated May 17, 2022 (8 pages).
Japanese Office Action for Japanese Application No. 2022-524143 dated Aug. 6, 2024 (4 pages).
English Translation of Japanese Office Action for Japanese Application No. 2022-524143 dated Aug. 6, 2024 (4 pages).

* cited by examiner

ELECTRICAL MEASURING ASSEMBLY FOR SECONDARY ALKALI SOLID-ELECTROLYTE BATTERIES

INTRODUCTION

The present disclosure, per an embodiment, relates to a measuring arrangement for secondary alkaline solid electrolyte batteries comprising two electrically non-conductive cell body halves, both cell body halves comprising at least one and one cell body half comprising at least three feedthroughs, both cell body halves forming a receiving space for receiving a solid electrolyte battery cell comprising at least an anode, a cathode and a solid electrolyte; an electrically conductive holding element for each feedthrough; an electrical contact element for each support element, the electrical contact element being adapted to change its length in response to the force applied to the element; and two planar current conductors comprising electrically conductive and electrically non-conductive regions, at least one of the current conductors being adapted to form at least three separate electrically conductive connections between the contact elements and an electrode of the solid electrolyte battery cell. Furthermore, the present disclosure, per an embodiment, relates to the use of the measurement arrangement for determining the electrical characteristics of secondary alkaline solid electrolyte battery cells.

Increased user demands for sustainability and mobility have significantly changed the landscape of decentralized energy storage in recent decades. Whereas in the past the possibilities for the technical use of batteries were significantly limited due to their size, weight and only very limited electrical capacity, since the use of alkali metal-based energy storage systems, for example in the form of rechargeable lithium batteries, the possible applications have increased significantly. Since their market launch in the early 1990s, lithium-ion batteries have made mobile applications such as smartphones and laptops suitable for mass use.

Continuous further developments have also led to an increase in energy densities and application reliability. It is precisely these optimization steps that have contributed to the fact that lithium-ion batteries, for example, are nowadays considered as stationary energy storage devices for decentrally generated electricity in the private and industrial sectors. Furthermore, these innovative electrical storage systems form the basis of new, climate-friendly transport concepts in the field of electromobility.

One of the most important foundations for the targeted optimization of batteries is the ability to determine electrical cell properties quickly and reproducibly. In the field of liquid electrolyte research, 2-electrode setups in the form of pouch bags or button cells are classically used. These have the decisive disadvantage that a third electrode, the reference electrode, which is necessary for basic research but cannot be attached, is missing in order to be able to identify various degradation processes within a cell. For electrochemical analyses using a reference electrode, e.g. in the form of lithium metal, T-cells (for example from Swagelok) with appropriate inserts are often used. However, due to their geometry, these are only useful for cells with liquid electrolyte. The cell assemblies with reference electrode consist of many individual parts, which have to be cleaned individually and assembled accordingly in several steps. In a glovebox, for example, this is associated with a greater expenditure of time and an increased degree of difficulty. Pressure is usually distributed within the cells by means of individual pressure springs, which pass the pressure on to a press plunger. Swagelok T-cells have a reference at right angles to the electrolyte layer, which results in a greater distance between the reference and the working/counter electrode. This is acceptable for liquid electrolyte-based cells because the absolute resistance of the liquid electrolyte is low. However, for solid electrolytes, there is an increased resistance due to the longer path, which leads to measurable voltage differences. Furthermore, thermal deformation of the samples, e.g. melting of the polymer solid electrolytes, can lead to loss of contact between the electrodes and thus to cell test failure. All in all, these disadvantages are decisive for the fact that simple, reliable and reproducible measurements with a reference electrode on solid electrolyte batteries are difficult to perform with these setups.

The patent literature also contains a wide variety of suggestions for setting up measurement arrangements with reference electrodes.

For example, EP 1 924 849 B1 discloses a measurement system for thermodynamic evaluation of an electrochemical cell having electrodes; said system comprising: a means for measuring open circuit voltages of said electrochemical cell as a function of time; a composition controller electrically connected to said electrochemical cell for determining selected electrochemical cell compositions, said composition controller capable of determining a plurality of said selected compositions; a temperature controller in thermal contact with said electrochemical cell for determining a plurality of selected electrochemical cell temperatures at each of said selected compositions, thereby determining a plurality of selected electrochemical cell temperature and composition combinations; and an open-circuit voltage analyzer for receiving open-circuit voltage measurements as a function of time from said means for measuring open-circuit voltages and identifying open-circuit voltages at thermochemically stabilized conditions of said electrochemical cell at said electrochemical cell temperature and composition combinations, characterized in that said open circuit voltage analyzer is a processor capable of executing an algorithm that calculates observed rates of change in open circuit voltage per unit time at a selected electrochemical cell temperature and composition combination using said open circuit voltage measurements as a function of time received from said open circuit voltage measurement means, wherein said algorithm compares absolute values of said observed rates of change of open circuit voltage per unit time at said selected electrochemical cell temperature and composition combination to a threshold rate of change of open circuit voltage per unit time, and wherein said algorithm identifies an open circuit voltage equal to said open circuit voltage of said electrochemical cell at thermochemically stabilized conditions at said selected electrochemical cell temperature and composition combination when the absolute value of the observed rate of change of open circuit voltage per unit time is equal to or less than said threshold rate of change of open circuit voltage per unit time; wherein said threshold rate of change of open circuit voltage as a function of time is equal to or less than 1 $mVh^{-1}$.

Furthermore, EP 3 108 224 B1 discloses a reference electrode insert for an electrochemical test cell, in particular for testing lithium-ion cells, comprising a reference electrode and a sleeve for holding the reference electrode, characterized in that the sleeve and the annular reference electrode form a structural unit, the reference electrode being held firmly and captively encapsulated in the sleeve.

Such solutions, known from the prior art, can offer further potential for improvement, especially with regard to the flexibility and simplicity of the measurement setup as well as in the reproducibility of the parameters that can be collected.

SUMMARY

It is the task of the present disclosure, per an embodiment, to at least partially overcome the disadvantages known from the prior art. In particular, it is the task of the present disclosure, per an embodiment, to provide a solution that enables a large number of reproducible measurements within short set-up times under reproducible sample conditions.

According to the disclosure, per an embodiment, the task is solved by an electrical measuring arrangement for secondary alkali solid electrolyte batteries, wherein the measuring arrangement comprises at least:

two electrically non-conductive cell body halves, both cell body halves comprise at least one and one cell body half comprise at least three feedthroughs, both cell body halves each having a recess on the inside, the recesses together forming a receiving space for receiving a solid electrolyte battery cell comprising at least an anode, a cathode and a solid electrolyte, and the feedthroughs each extending from an outside of the cell body half to the receiving space;

an electrically conductive retaining element for each feedthrough, the retaining element being equipped to be mechanically connectable to the respective cell body half;

an electrical contact element for each support member, the electrical contact element being attachable to the support member towards the receiving space and being adapted to change its length in response to the force acting on the element; and two flat current conductors comprising electrically conductive and electrically non-conductive regions, at least one of the current conductors being equipped to form at least three separate, electrically conductive connections between the contact elements and an electrode of the solid electrolyte battery cell, the mechanical force of the contact elements being exerted on the solid electrolyte battery via the current conductors.

Surprisingly, it has been found that the multi-electrode measurement setup described above is capable of determining the electrical properties of solid electrolyte battery cells in a very reproducible manner. The setup is simple in the sense that it consists of only a few parts and, as a result, can be quickly disassembled and assembled even under "unfavorable" glovebox conditions. In addition, the structure is also easy to clean. The possibility of using large-area metal current collectors in the form of the retaining elements also allows fast and uniform temperature control of the cell interior at the same time. The setup generally exerts a very uniform and controllable force on the solid electrolyte battery cells to be measured. Therefore, there is only a slight risk of mechanical damage to the cells, which then inevitably leads to faulty measurements or measurement aborts. Furthermore, the chosen design allows the usually uneven sample surfaces of solid electrolyte battery cells to be reliably leveled and thus reliably contacted. Moreover, due to the small number of moving parts, the setup can be reliably sealed with only a small number of seals. In particular, the holding elements and their choice of material also allow the heating period of the entire cell assembly to be controlled, so that fast temperature profiles can be run with the measurement arrangement.

The measuring arrangement according to the disclosure, per an embodiment, is an electrical measuring arrangement for secondary alkali solid electrolyte batteries. A solid electrolyte is also called a solid state electrolyte, solid body electrolyte or solid ionic conductor. The solid electrolyte has a coherent polymeric support structure and alkali metal ions embedded therein, which are mobile within the polymeric matrix of the solid electrolyte. An electric current can flow via the mobility of the ions in the solid electrolyte. Solid electrolytes are electrically conductive, but show rather low electronic conductivity compared to metals. An alkali metal solid battery has at least two electrodes and a solid, in particular non-flowing electrolyte arranged between the electrodes. In addition to these components, a solid-state battery may have other layers or sheets. For example, a solid-state battery may have other layers between the solid electrolyte and the electrodes. The electrical properties of alkali metal solid state batteries are based on the redox reaction of alkali metals, i.e., the metals from the $1^{st}$ main group of the periodic table. In particular, lithium, sodium and potassium can be used as alkali metals.

The structure according to the disclosure, per an embodiment, has two electrically non-conductive cell body halves, both cell body halves having at least one feedthrough and one cell body half having at least three feedthroughs, the feedthroughs each extending from an outer side of the cell body half towards the receiving space. The electrically non-conductive cell body halves may be made of PP, PE, PTFE, PEEK or POM or other non-conductive plastics. PEEK may be suitable in combination with electrically conductive parts made of stainless steel, since the thermal expansion coefficient of both materials is approximately the same in the temperature range relevant here. The cell body halves can have a symmetrical structure in the sense that they are constructed in the same way. The feedthroughs extend for each half from the upper to the lower side, with the feedthroughs penetrating the entire cell body half in each case. For each cell half, the feedthrough enables contact to be made with the receiving space of the battery cell to be measured, for example in the form of one or more concentric holes. The number of possible feedthroughs is in principle limited only by the area of the feedthroughs and the area of the cell bodies. Expediently, each cell body half may have 1, 2, 3, 4, 5 or 6 feedthroughs, with at least one cell body half having at least three holes. The two cell body halves may have further means for mechanically holding the two cell body halves together. The latter, for example, in the form of clamps or hand screws. However, it is also possible for the two cell parts to be held together by a mechanical press that is not part of the actual measurement setup. In the further description, reference is made to an "upper" and "lower" cell half. These designations are chosen arbitrarily and can also be replaced by "right" and "left".

Both cell body halves each have a recess on the inside, the recesses together forming a receiving space for receiving a solid electrolyte battery cell comprising at least an anode, a cathode and a solid electrolyte. Thus, both cell body halves have an "upper" part and a "lower" part, and when the cell body halves are joined together, the lower parts are in contact with each other. These lower parts of the cell body halves then also each have the recess, which then in total forms the accommodation space for the battery cell. In addition to the battery cell as such, the accommodation space can also at least partially accommodate other components of the cell structure, such as the current collectors or the contact elements. The recesses for the accommodation space on the two halves of the cell body can be the same, approximately the same size or different in size. Preferably, per an embodiment, both cell body halves have approximately equally sized recesses, thus resulting in a symmetrical accommodation space for the battery cell. One or both cell body halves can also comprise devices for temperature control of the cell or further sensors, such as temperature sensors.

An electrically conductive retaining element can be inserted into each feedthrough, the retaining element being equipped to be mechanically connectable to the respective cell body half. A conductive retaining element can be or has been introduced into each feedthrough for contacting the battery cells in the receiving space. The retaining element can be designed, for example, as a metal pin or a metal screw which is driven or screwed into the cell body halves. The hammering or screwing in creates a mechanical connection between the retaining element and the cell body half. The retaining element can be made of stainless steel, steel, copper, platinum or other conductive metals. Stainless steel screws are preferred. The distance of a retaining element from the beginning of the receiving space can be in the range between 0.1-35 mm, preferably between 0.25-5 mm. This can lead to a faster thermal response of the battery cell.

Each retaining element can be connected to an electrical contact element, the electrical contact element being attachable to the retaining element towards the receiving space and being adapted to change its length in dependence on the force acting on the element. Electrical contact elements, which are or can be attached to the retaining elements, are used to make electrical contact with a battery in the receiving space. This can be done, for example, by passing the contact elements through hollow retaining elements and exiting at the tip of the retaining elements. However, it is also possible for the contact elements to be attached to the retaining elements at the tip thereof. In this case, the contact elements can be made of different metals or metal alloys. The contact elements are adapted to change their length depending on the force acting on the element. The contact elements do not have rigid mechanical structures, but are able to adapt to the mechanically acting forces. For example, spring elements in the contacts can ensure that the length of the element is not rigid but a function of the mechanical load currently present. However, gas springs or contacts with gas spring elements can also be used, for example.

The structure also has two flat current collectors with electrically conductive and electrically non-conductive areas, at least one of the current collectors being set up to form at least three separate, electrically conductive connections between the contact elements and an electrode of the solid electrolyte battery cell. Flat current conductors can be in the form of more or less thin discs or cylinders, for example, and preferably, per an embodiment, cover at least the electrode surfaces of the batteries to be measured in their surface area. Preferably, per an embodiment, the area of the current collectors may be somewhat smaller (e.g., 0.1 mm) than the area of the recess in the cell body halves to allow easy sliding of the current collectors within the assembled cell halves. In this regard, for assemblies of at least two electrodes, the current collectors are made of at least two different conductive and non-conductive materials. The different materials can provide current dissipation paths through the current collectors so that different conductive connections can be made to different contact elements. In addition, different locations on the battery electrode can be contacted. Furthermore, the current collectors can also accommodate parts of the battery cell so that, for example, an electrode of the measuring arrangement can be present embedded in the current collector. This can contribute to a more homogeneous pressure distribution and reduced risk of short circuits due to penetration of softer polymer membranes. For example, the current collectors may be in the form of ring electrodes. In this case, the distance between the one inner and outer current collector surface can be in the range of 0.1-5 mm, preferably the distance can be in the range of 0.5-2 mm, further preferably in the range of 1-1.5 mm.

In the setup according to the disclosure, per an embodiment, the mechanical force of the contact elements is exerted on the solid electrolyte battery via the current collectors. In total, this results in a setup in which the battery cell to be measured is present in the center of the receiving space formed by the recesses of the cell body halves, whereby the battery cell is enclosed by at least the two current collectors and makes electrical contact with the contact elements via the current collectors. The electrical signals can then be conducted out of the measuring arrangement via the retaining elements. The contact elements provide the electrical contact to the current collectors and, due to the variable length of the contact elements, a force range can also be defined which is applied via the contact elements to the current collectors and thus to the battery cell.

Within an embodiment of the measuring arrangement, the measurement arrangement can be rotationally symmetrical. A rotationally symmetrical measuring cell has proven to be particularly suitable for obtaining a mechanical and thermal structure that is as symmetrical as possible. The number of cell errors during measurements can be reduced by this setup. In addition, the measured values obtained are particularly meaningful, since differences due to different temperature gradients or different mechanical loading of the cell can be largely excluded. This may be an advantage over prior art setups, which are often based on an asymmetric cell design. Swagelok T-cells, for example, have a reference at right angles to the electrolyte layer, which leads to a greater distance between the reference and the working/counter electrode.

Within an embodiment of the measurement arrangement, the different contact elements of each cell body half may comprise different metals. Thus, the contact elements of a cell body half may comprise different metals or metal alloys. Due to the fact that the contact elements can be independently connected to the holding elements, each individual contact element can be selected independently of the other contact elements based on its desired electrical properties. Moreover, the metal selection for the contact elements can also be chosen differently for the two halves of the cell body. For example, in a structure with four holes and four contact elements, one contact element can be designed as a copper, platinum, nickel and iron contact respectively. This results in a flexible design, whereby the specific material selection per contact point can be flexibly adapted to the measurement task.

Within the scope of an embodiment of the measuring arrangement, the electrical contact element can be a spring contact and the arrangement of the contact elements can be rotationally symmetrical towards the receiving space. Symmetrical contacting of the battery cells via spring contacts has proven to be particularly mechanically reproducible. The proportion of faulty measurements due to a physical failure of the solid-state setup during the measurements can thus be reduced. In addition, the measurement setup can be flexibly adapted to many different solid-state battery cells via the properties of the mechanical spring elements. A rotationally symmetrical design of the contact elements also means that the mechanical and thermal load on the battery cell is as uniform as possible, so that different measured values can be attributed purely to the battery properties. The spring contacts can be made of copper or gold or gold-plated to enable ideal electrical contact. At the same time, these materials are inert to chemical reactions with test substances within the cell. However, in principle, all electrically conductive spring contacts are possible. Especially when used with sulfidic electrolytes and sulfur-based materials, gold is preferred, per an embodiment, in order to prevent a reaction and degradation of common copper contacts. The ratio of spring contact area to current collector area can preferably be between 1:1500 and 1500:1, ideally in the range between 1:200 and 200:1 and even more preferably in the range between 150:1 and 50:1. The maximum deflection of the spring contacts in the ground state is preferably, per an embodiment, at least the depth of the receiving space. The ratio of the height from the receiving space to the height of the contact elements can be between 100:1 and 1:1, preferably in the ratio 1.5:1.

In an embodiment of the measuring arrangement, each measuring body half can have four feedthroughs, four retaining elements and four contact elements, with one of the electrical contact elements arranged centrally and the other three contact elements arranged on a circular path around the central contact element and the other three contact elements offset on the circular path by 120° in each case. This arrangement of the contact elements to the current collector can lead to a particularly uniform mechanical load on the battery cell. The result is a flat structure of the battery cell with intimate contact between the solid electrolyte and the electrodes. In addition, the thermal structure results in as few temperature gradients as possible in the battery cell. This design of the electrode inserts allows up to four different electrical signals of a 4-electrode cell to be measured. For example, lithium metal can serve as a counter and reference electrode, and at the same time the potential can be measured against a freely selectable reference, such as gold.

In an embodiment of the measurement arrangement, the electrical contact elements of the lower and upper halves of the cell body can be arranged offset from each other by 60° during the measurement. In the assembled state, cell designs in which the electrical contacts of the lower and upper cell body halves are offset from one another have proven effective. This can increase the number of contacted areas for heat transfer and lead to faster heating of the sample. In addition, the pressure exerted on the specimen can be better distributed as a result.

Within an embodiment of the measuring arrangement, the current collectors can have depressions at the points where the current collectors are electrically contacted by the contact elements. The depressions are filled by the contact elements towards the measurement. This design results in a flat alignment of the battery cell assembly with a mechanical load that is as uniform as possible during the measurement. In addition, this design enables improved gas tightness of the assembly, which can contribute to a reduction in faulty measurements due to leakage.

Within an embodiment of the measurement arrangement, one of the current collectors may have a cylindrical geometry and the other current collector may have a cylindrical geometry with rounded edges. Preferably, per an embodiment, at least one of the electrode inserts may have rounded edges that allow for more flexible contacting of the current collector to the inserted electrode. The latter can be particularly relevant for ceramic electrodes, as the creation of flat surfaces for this type of electrode is technically challenging.

In an embodiment of the measuring arrangement, each of the current collectors may have a recess towards the inside of the receiving space, the recess being adapted to receive an electrode of the solid electrolyte battery. The integration of one or more electrodes of the battery cell into the current collectors can lead to a particularly flat alignment of the solid electrolyte and to a particularly efficient and uniform contacting of the solid electrolyte by the current collector. The setup is mechanically balanced and also results in symmetrical temperature behavior. This design can reduce the number of measurement interruptions due to insufficient contacting of the solid electrolyte or leaks in the cell.

In an embodiment of the measuring arrangement, the spring contacts can have a spring constant of greater than or equal to 0.05 N and less than or equal to 50 N. These ranges for the spring constant have proven to be particularly suitable for producing a sufficiently mechanical connection of the current collectors to the contact elements. The possible forces are not too high, so that damage to the current collectors is avoided. The constants are also not too low, so that sufficient mechanical contacting is ensured even in the event of thermally induced expansion or contraction of the battery cell.

The use of a measuring arrangement according to an embodiment for determining the electrical properties of secondary alkali solid electrolyte battery cells is also in accordance with the disclosure. The setup according to an embodiment can be used to flexibly and reliably measure a wide variety of solid electrolyte battery cells with, for example, a three-electrode structure. The proportion of measurement artifacts caused by mechanical damage to the battery cell or insufficient contact between the solid electrolyte and the current collector can be significantly reduced by this setup. In addition, it is easy to assemble without the need for additional wear parts, such as additional polymer membranes.

BRIEF DESCRIPTION OF THE FIGURES

Further advantages and advantageous embodiments of the objects according to the disclosure are illustrated by the drawings and explained in the following description. It should be noted that the drawings are descriptive only and are not intended to limit the invention in any way. It shows the FIG. 1 a schematic side view of an embodiment of a cell body half (bottom).

DETAILED DESCRIPTION

Figure 1:
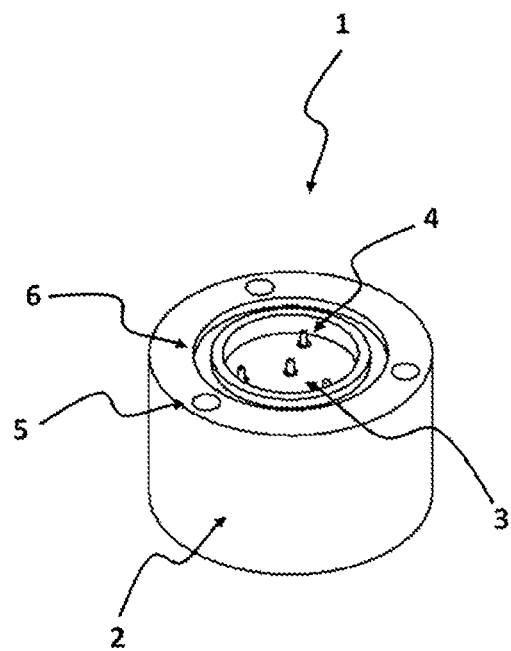

FIG. 1 shows a schematic side view of a cell body half 1. The cell body half 1 shown may be referred to, for example, as a lower cell body half 1. The actual cell body 2 may be made of a plastic such as PEEK. The cell body half 1 is configured to be combined with another cell body half 1. For this purpose, the cell body half 1 has bores 5 through which both cell body halves 1 can be connected to each other. For example, screws can be guided through the holes 5, through which both cell body halves 1 can be screwed together. The cell body half 1 shown also has an optional groove 6, which can accommodate an O-ring. Furthermore, this view shows the contact elements 4 and the receiving space 3 in which the battery cell can be placed for the actual measurement.

Figure 2:
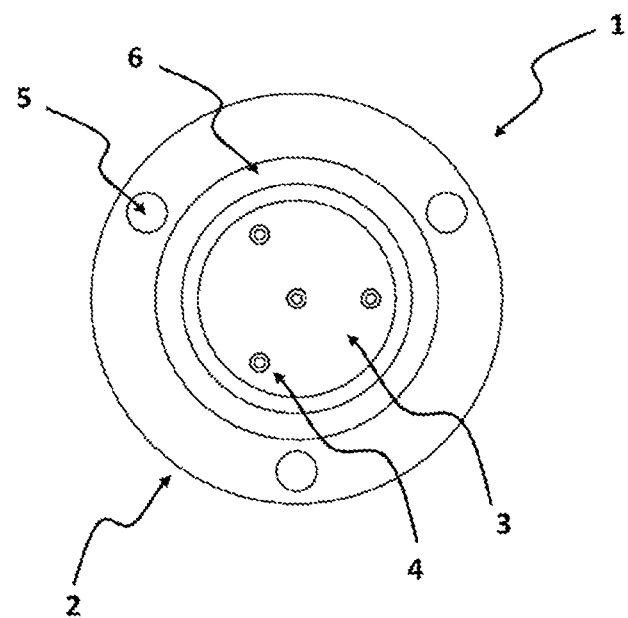
FIG. 2 a schematic top view of an embodiment of a cell body half (bottom)

FIG. 2 shows a top view of a cell body half 1. The actual cell body 2 with holes 5, the optional recess for an O-ring 6, the individual contact elements 4, here in this example there are four individual contact elements 4, and the receiving space 3 for the actual battery cell are shown.

Figure 3:
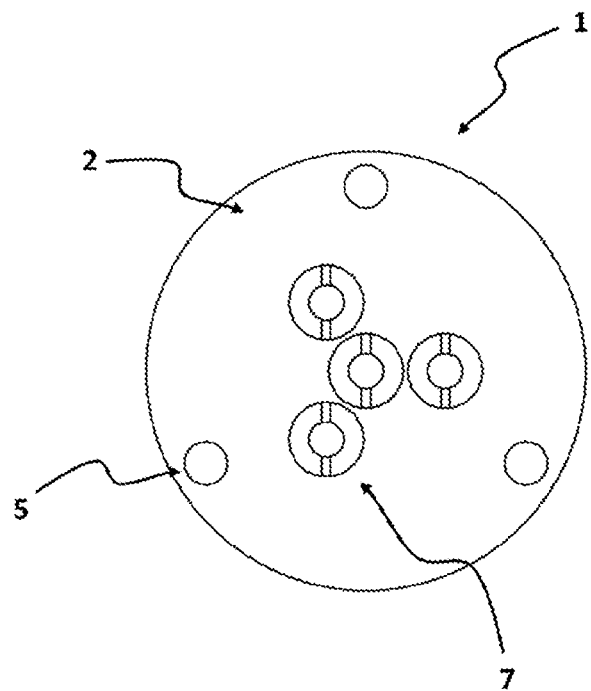
FIG. 3 a schematic bottom view of an embodiment of a cell body half (bottom)

FIG. 3 shows a view of a cell body half 1 from below. In this figure, the actual cell body 2, the three holes for connecting two cell body halves 1 and the retaining elements 7 can be seen. The retaining elements 7 may be mechanically connected to the actual cell body 2, for example in the form of screws. The retaining elements 7 can be stainless steel screws, for example, which lead from the underside of the cell body half 1 to the receiving space. The stainless steel screws have a recess for a spring contact (not shown) at the end pointing into the cell interior. This allows simple, flexible replacement of damaged spring contacts when unscrewing or the use of spring contacts with other spring constants to change the contact pressure inside the cell. The retaining elements 7 are held gas-tight towards the outside by an O-sealing ring (placed in a sealing ring groove), which is pressed against the body by the screw head. At the same time, a 4 mm diameter hole can lead into the screw head. The retaining elements 7 can be electrically contacted from below with conventional 4 mm laboratory plugs. The head shape of the retaining elements is arbitrary, but can have a slot for a screwdriver. The small number of parts allows very easy assembly, both under normal conditions and inside a glovebox with only limited room for movement.

Figure 4:
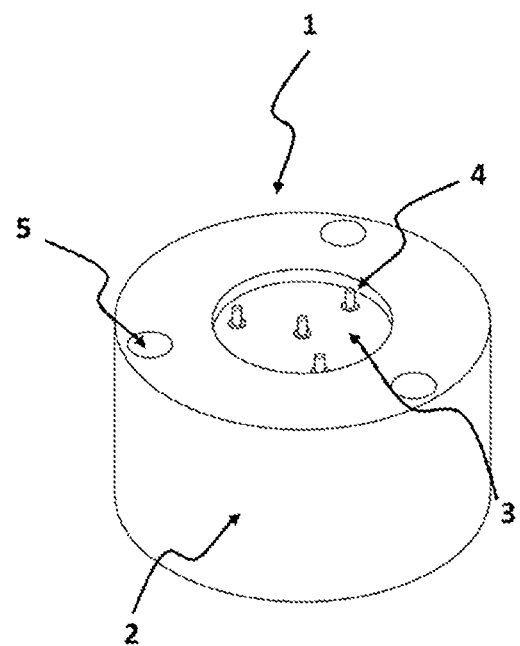
FIG. 4 a schematic side view of an embodiment of a cell body half (top)

FIG. 4 shows a further embodiment of a cell body half 1. This cell body half 1 can be regarded, for example, as the upper cell body half 1 of an arrangement of two cell body halves 1. Like the lower cell body half 1, the upper cell body half 1 has holes 5 which can be used to connect the two cell body halves 1. The cell body 2 itself is made of plastic material. Individual contact elements 4 are shown at the head of the retaining elements (not shown). Also in this embodiment of the upper cell body half 1, four contact elements 4 are shown as an example. However, the different cell body halves 1 can have different numbers of contact elements 4 and thus also retaining elements 7. For example, it is possible for the upper cell body half 1 to have only one contact element 4. Like the lower cell body half 1, the upper cell body half 1 has a recess 3 in which the actual measuring cell can be placed during measurement.

Figure 5:
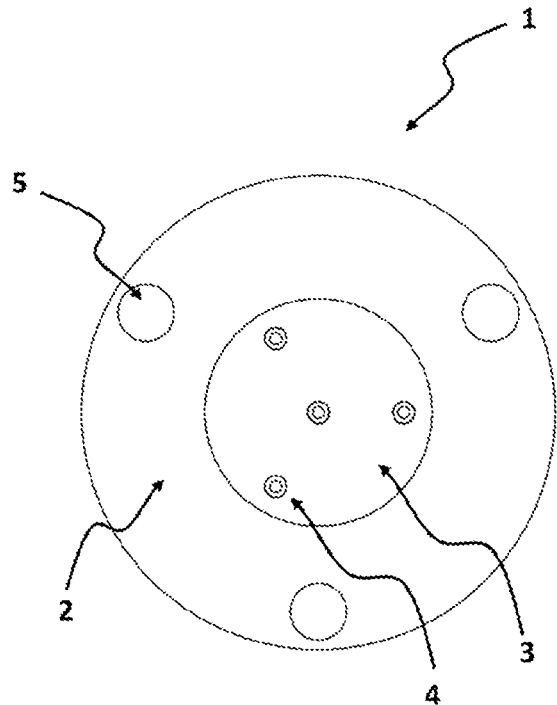
FIG. 5 a schematic top view of an embodiment of a cell body half (top)

FIG. 5 shows a top view of a cell body half 1, in this case an upper cell body half 1. In this top view, the actual cell body 2, the bores 5, the receiving space 3 and the contact elements 4 can be seen. In this embodiment, there are four individual contact elements 4 in the receiving space 3. It can also be seen that each cell body half 1 does not necessarily have to have a sealing ring groove.

Figure 6:
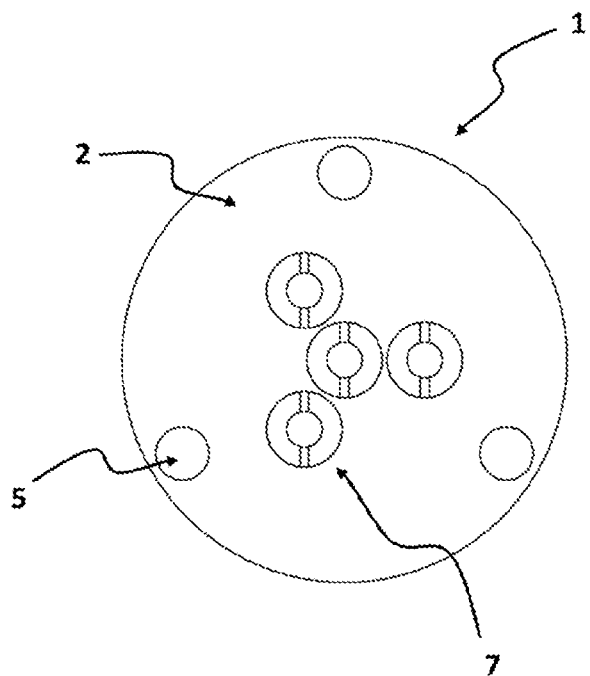
FIG. 6 a schematic top view of an embodiment of a cell body half (top)

FIG. 6 shows a possible design of an upper cell body half 1 in a view from below. The actual cell body 2 is visible, in which the four retaining elements 7 are embedded. In addition, this view also shows the holes 5 through which the two cell body halves 1 can be connected to each other by means of screws.

Figure 7:
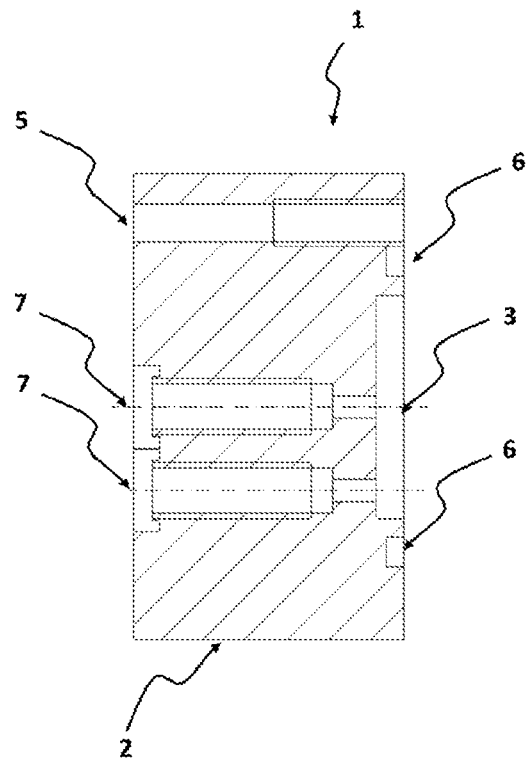
FIG. 7 a schematic section through an embodiment of a cell body half (bottom)

FIG. 7 shows a cross-section of an embodiment of a lower cell body half 1. The retaining elements 7 can be seen extending through the cell body 2. The retaining elements 7 are hollow and can, for example, accommodate a plug for electrical contacting. Contact elements (not shown) can be attached to the tip of each of the retaining elements 7. Together with the contact elements, the retaining elements 7 connect one side of the cell body to the receiving space 3. Furthermore, recesses 6 are provided in the actual cell body 2, which can serve to receive a seal. Furthermore, a hole 5 is shown through which a screw can connect two halves of the cell body.

Figure 8:
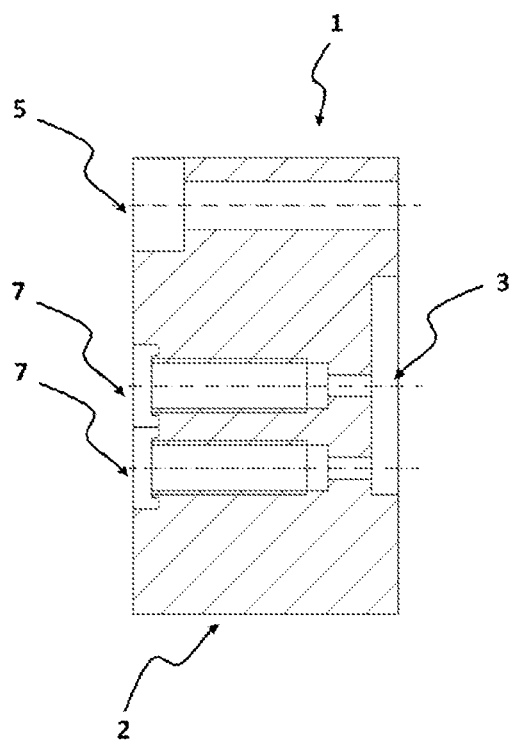
FIG. 8 a schematic section through an embodiment of a cell body half (top)

FIG. 8 shows a cross-section of an embodiment of an upper cell body half 1. The retaining elements 7 can be seen, which extend through the cell body 2. The retaining elements 7 are hollow and can, for example, accommodate a plug for electrical contacting. Contact elements (not shown) can be attached to the tip of each of the retaining elements 7. Together with the contact elements, the retaining elements 7 connect one side of the cell body to the receiving space 3. Furthermore, recesses 6 are provided in the actual cell body 2, which can serve to receive a seal. Furthermore, a hole 5 is shown through which a screw can connect two halves of the cell body.

Figure 9:
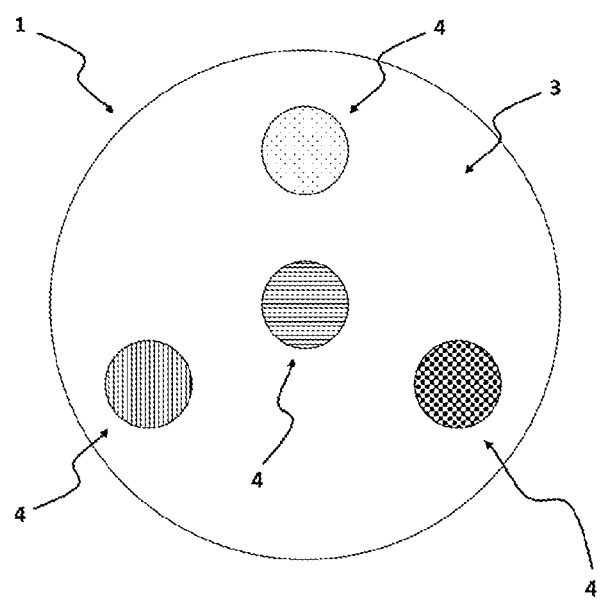
FIG. 9 a schematic top view of an embodiment of a cell body half with 4 different contact elements.

FIG. 9 shows a top view of an embodiment of a receptacle 3 of a cell body half 1 with four different contact elements 4. The contact elements 4 can be, for example, contact elements 4 made of copper, platinum, nickel and iron and serve as measuring points in a single assembly of the cells one after the other or simultaneously. Compared to microcontacts, which are pressed against the sample with a spring over a small area, this allows a reduced risk of short-circuits, since the pressure applied to the sample is distributed more evenly.

Figure 10:
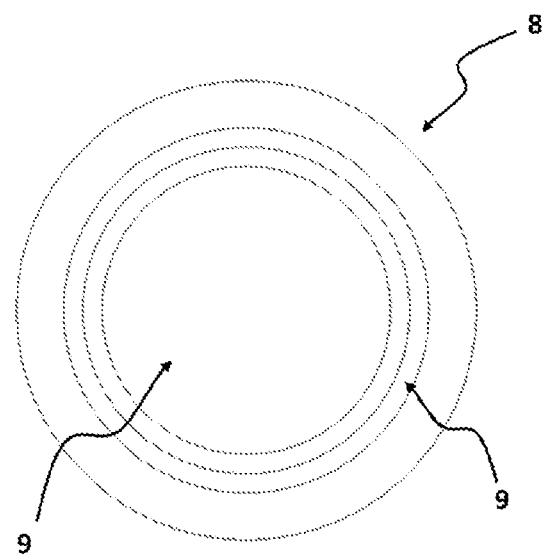
FIG. 10 a schematic top view of an embodiment of a current collector (bottom)
Figure 11:
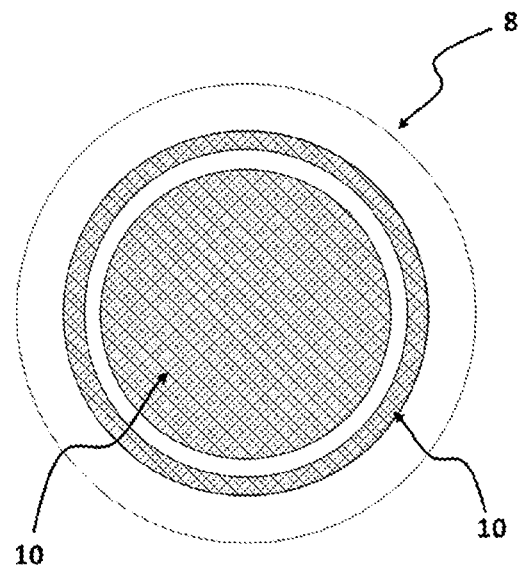
FIG. 11 a schematic top view of an embodiment of a current collector with embedded electrode layer (bottom)

FIGS. 10 and 11 show schematic views of current collector 8 (below). The current collector 8 can be annular in shape and minimally smaller than the diameter of the receiving space 3 (e.g. 0.1 mm) to allow easy sliding within the receiving space 3. This represents a major advantage of this design, per an embodiment. A fixed cell design can be used, in which any current collectors 8 of different construction can be used. FIG. 10 shows that the current collector 8 can have recesses 9 on its surface, which can be filled with an electrode material of the battery cell to be measured. In the FIG. 10, the current collector 8 is shown without further filling with electrode material. In the FIG. 11, the same embodiment is shown with the recesses of the current collector 8 filled with, for example, lithium metal 10. This results in two concentric areas on the current collector, which are separated by a non-conductive, central area.

Figure 12:
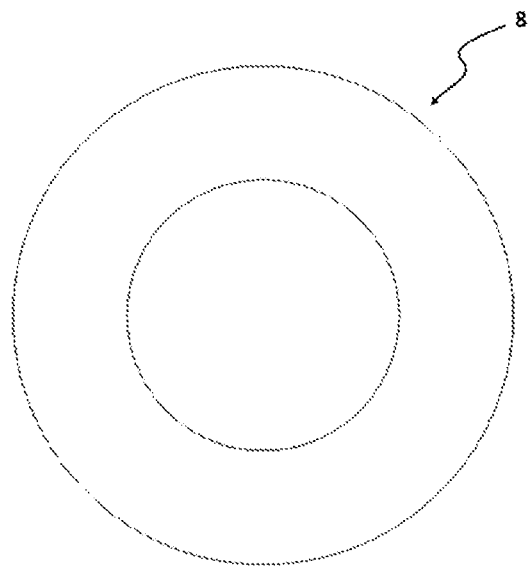
FIG. 12 a schematic top view of an embodiment of a current collector (top)

FIG. 12 shows a further embodiment of a current collector 8 in plan view (top). This current collector 8 has no recesses on the surface. The inner circle of the current collector 8 indicates that this current collector is made of two different materials. For example, the inner area may be made of stainless steel and the outer area may be made of a non-conductive plastic material.

Figure 13:
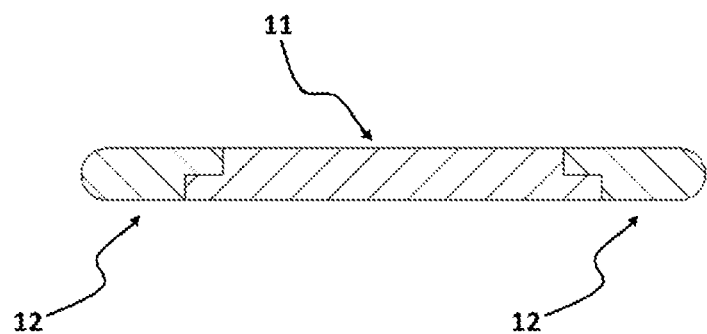
FIG. 13 a schematic cross-section of a current collector (top)
Figure 14:
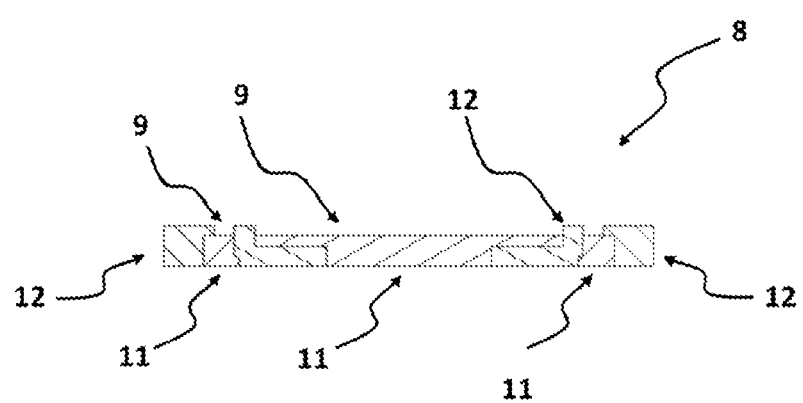
FIG. 14 a schematic cross-section of a current collector (bottom)

FIGS. 13 and 14 show possible designs of current collectors 8 in a sectional view. FIG. 13 shows, for example, an embodiment for an upper current collector 8. This current collector 8 does not have any recesses in the surface and is also not designed to receive electrode material of the battery cell to be measured. The inner portion 11 is made of stainless steel, whereas the two outer portions 12 may be made of a plastic material. The upper current collector 8 has a cylindrical shape, with the cylinder corners being rounded. FIG. 14 shows a cross-section of a possible lower current collector 8. Here, the lower current collector 8 may represent a cylinder with straight edges. This serves to ensure that the lower current collector 8 is pressed uni-axially upwards by the spring contacts, whereas the upper current collector 8 has increased flexibility within the housing due to the rounded edges and can, for example, be pressed more evenly against any sample surface by four contact elements 4. This is important, for example, for brittle ceramic solid electrolyte disks or pressed sulfidic tablets, as it allows the advantage of a reproducible internal pressure, which is independent of the external screw connection, per certain embodiments. The latter is the case, for example, with Swagelok T-cells. In this context, the exchange of these current collector 8 between top and bottom, as well as a combination of two rounded or two non-rounded current collectors 8 is possible.

Figure 15:
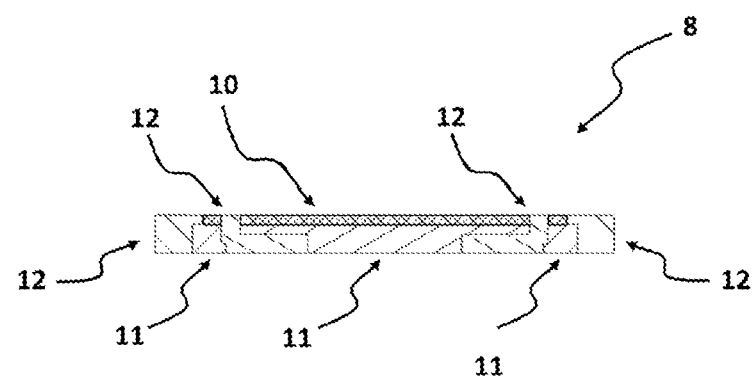
FIG. 15 a schematic cross-section of a current collector with embedded electrode layer (bottom)

FIGS. 14 and 15 show possible embodiments of a lower current collector 8 with a recess on the surface of the current collector 8. Parts of the electrodes of the battery cell can be embedded in the recesses of the current collector 8. With these electrode components, a flat surface is obtained for the current collector 8. Furthermore, it can be seen in the figure that the current collector 8 has a cylindrical shape and is made of different materials. In this respect, the current collector 8 can comprise areas which are formed from stainless steel 11 or from a plastic material 12. By the choice of the conductive areas, the contacting to the contact elements 4 (not shown) is established. This design of the current collectors 8 is so flexible that they can in principle also be used as current collectors for other cell types, such as Swagelok T-cells. These improve the basic principle of these T cells, per an embodiment, since the reference electrode now no longer has to be attached at right angles. In addition, the same advantages arise in principle as for the structure, for example in terms of improved pressure distribution.

Figure 16:
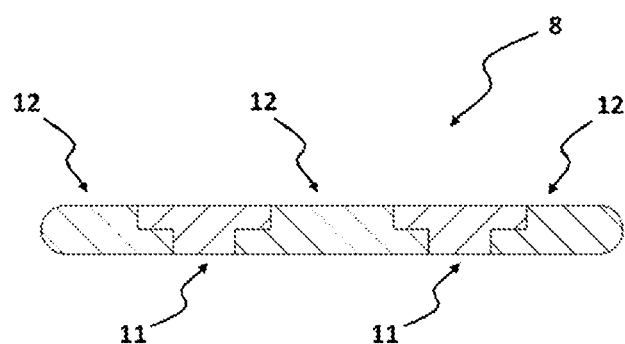
FIG. 16 a schematic cross-section of a current collector for a four-electrode insert.

FIG. 16 shows a further embodiment for a current collector 8. This embodiment is suitable, for example, for measuring battery cells with a structure with four contact elements 4 (not shown).

Figure 17:
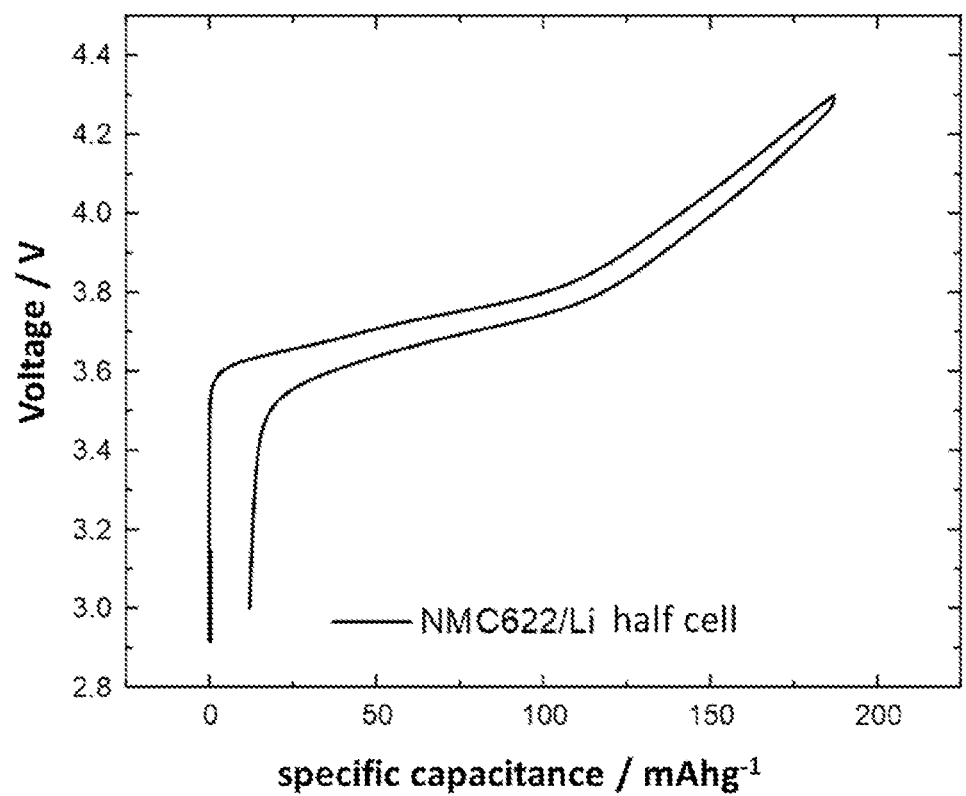
FIG. 17 a measurement series of an NMC622/Li half cell, plotted is the voltage as a function of the specific capacitance.

FIG. 17 shows a measurement curve obtained using the cell design. It shows the voltage behavior of a secondary lithium battery cell as a function of the specific capacitance within a cycle experiment. The battery cell is of the following construction. Cell body parts from FIGS. 1 and 3 were used, using an O-seal ring and gold-plated copper spring contacts with a spring constant of 1.5 N. The reference electrode and negative electrode were used as a function of the specific capacitance within a cycle experiment. The reference electrode and negative electrode were made of lithium and embedded in a current collector as shown in FIG. 11. NMC622 was used as the active material of the positive electrode and electrically contacted by means of a current collector as shown in FIG. 12. PEO-LiTFSI was used as separator and solid electrolyte. The cell was operated galvanostatically with a charge and discharge current of 15 mA g$^{-1}$. The measurements are very reproducible and the proportion of measurement failures is extremely low.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. Electrical measuring arrangement for secondary alkali solid electrolyte batteries,
wherein
the measuring arrangement comprises at least:
two electrically non-conductive cell body halves, both cell body halves comprising at least one and one cell body half comprising at least three feedthroughs, both cell body halves each having a recess on an inside, the recesses together forming a receiving space for receiving a solid electrolyte battery cell comprising at least an anode, a cathode, and a solid electrolyte, and the feedthroughs each extending from an outer side of the cell body half towards the receiving space;
an electrically conductive retaining element for each feedthrough, the retaining element being equipped to be mechanically connectable to the respective cell body half;
an electrical contact element for each retaining element, the electrical contact element being attachable to the retaining element towards the receiving space and being adapted to change its length in dependence on force acting on the electrical contact element; and
two flat current conductors comprising electrically conductive and electrically non-conductive regions, at least one of the current conductors being equipped to form at least three separate, electrically conductive connections between the electrical contact elements and an electrode of the solid electrolyte battery cell, wherein a mechanical force of the electrical contact elements is applied to the solid electrolyte battery via the current conductors.

2. The measuring arrangement according to claim 1, wherein the receiving space is rotationally symmetrical.

3. The measuring arrangement according to claim 1, wherein the different electrical contact elements of each cell body half comprise different metals.

4. The measuring arrangement according to claim 1, wherein the electrical contact element is a spring contact and the arrangement of the electrical contact elements is rotationally symmetrical towards the receiving space.

5. The measuring arrangement according to claim 4, wherein each measuring body half has four feedthroughs, four holding elements and four electrical contact elements, wherein one of the electrical contact elements is arranged centrally and the further three electrical contact elements are arranged on a circular path around a central electrical contact element and the three further contact elements are arranged on a circular path offset by 120° in each case.

6. The measuring arrangement according to claim 5, wherein the electrical contact elements of the lower and upper cell body halves are arranged by 60° offset from each other during measurement.

7. The measuring arrangement according to claim 4, wherein the spring contacts have a spring constant of greater than or equal to 0.05 N and less than or equal to 50 N.

8. The measuring arrangement according to claim 1, wherein the current conductors have recesses at the points at which the current conductors are electrically contacted by the electrical contact elements.

9. The measuring arrangement according to claim 1, wherein one of the current conductors has a cylindrical geometry and the other current conductor has a cylindrical geometry with rounded edges.

10. The measuring arrangement according to claim 1, wherein each of the current conductors has a recess towards the inside of the receiving space, the recess being adapted to receive an electrode of the solid electrolyte battery.

11. A method of using the Use of a measuring arrangement according to claim 1 wherein the solid electrolyte battery cell is coupled to the measuring arrangement and then an electrical test is performed.

* * * * *